Feb. 13, 1951          D. W. GEHRON          2,541,755
TRAILER HITCH
Filed June 15, 1949          2 Sheets—Sheet 1
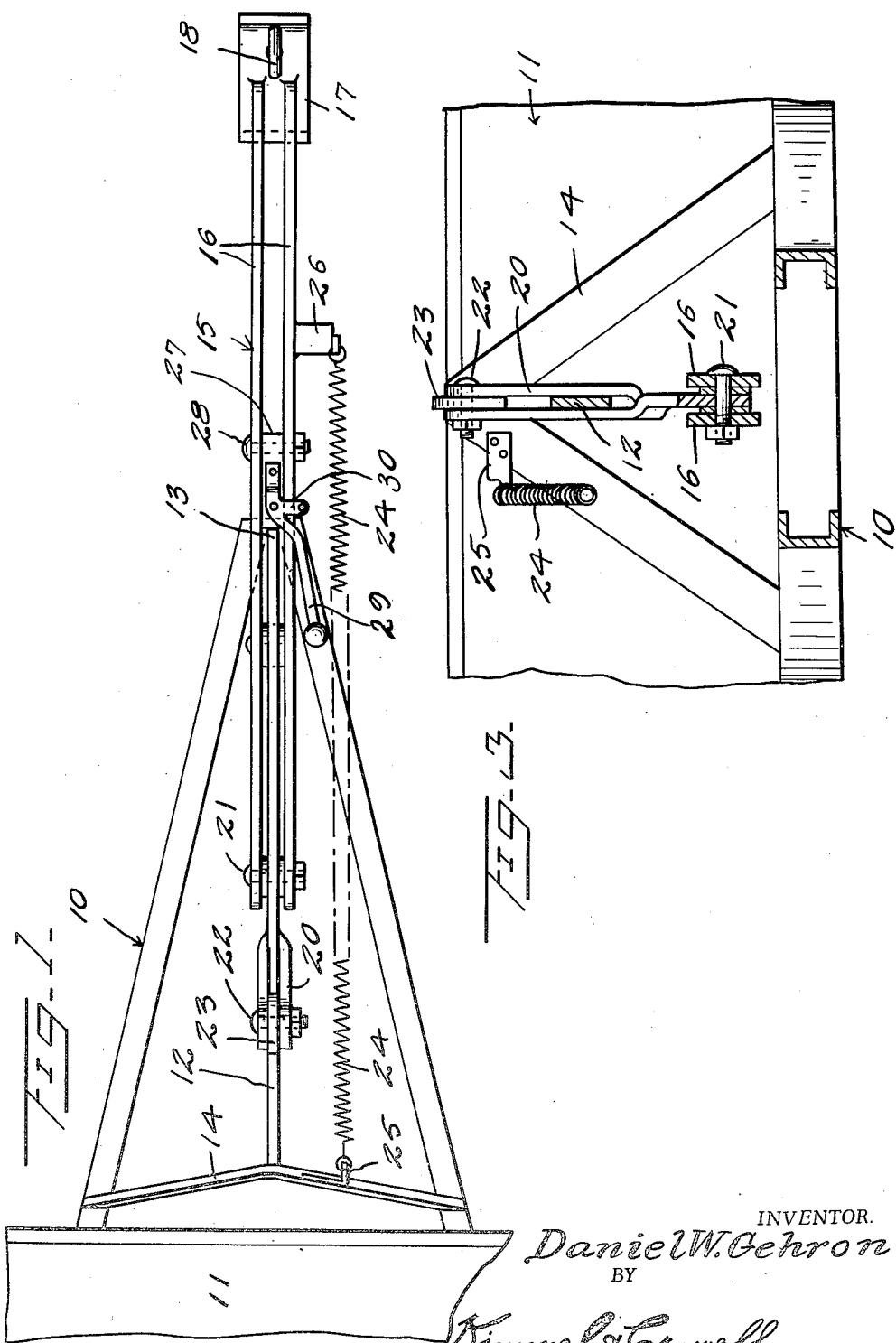
INVENTOR.
Daniel W. Gehron
BY
Kimmel & Crowell ATTORNEYS Feb. 13, 1951 — D. W. GEHRON — 2,541,755
TRAILER HITCH
Filed June 15, 1949 — 2 Sheets-Sheet 2
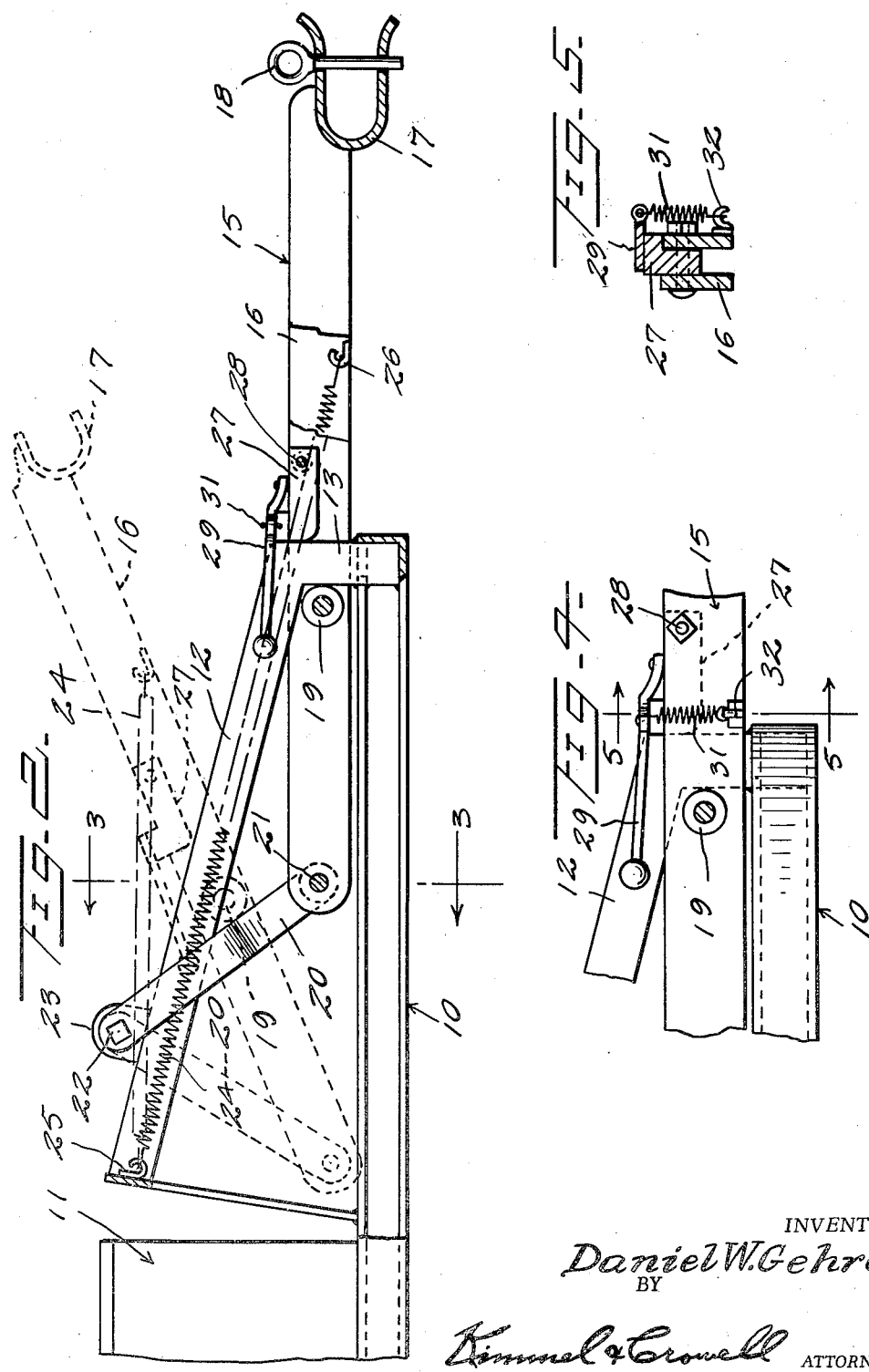
INVENTOR.
Daniel W. Gehron
BY
Kimmel & Crowell ATTORNEYS Patented Feb. 13, 1951

2,541,755

UNITED STATES PATENT OFFICE 2,541,755

TRAILER HITCH

Daniel W. Gehron, North Star, Ohio

Application June 15, 1949, Serial No. 99,202

4 Claims. (Cl. 280—33.44)

This invention relates to trailer hitches.

An object of this invention is to provide a trailer hitch which will automatically raise the trailer vehicle and will automatically lock when pull is exerted thereon by the tractor vehicle.

Another object of this invention is to provide a hitch which is designed particularly for two-wheeled vehicles which will automatically raise the drawbar to a horizontal operative position when pull is exerted by the tractor, the hitch being so constructed and arranged that the drawbar may be released and lowered to inoperative position while the hitch is still connected with the tractor.

A further object of this invention is to provide in combination, a drawbar, a hitch bar swingably connected at its rear end with the drawbar adjacent the rear of the drawbar, and a sliding latchable connection between the drawbar and the hitch bar which will permit the drawbar to drop down for contact with the ground when the latch connection is in released position.

With the above and other objects in view, my invention consists in the arrangement, combination and details of construction disclosed in the drawings and specification, and then more particularly pointed out in the appended claims.

In the drawings;

Figure 1 is a plan view of a self-raising hitch constructed according to an embodiment of this invention, Figure 2 is a detail side elevation, partly in longitudinal section, of the device, Figure 3 is a sectional view taken on the line 3—3 of Figure 2, Figure 4 is a fragmentary side elevation of the latching portion of the hitch, Figure 5 is a sectional view taken on the line 5—5 of Figure 4.

Referring to the drawings, the numeral 10 designates generally a V-shaped draft bar which is secured to the forward end of a 2-wheeled vehicle 11. An upwardly and rearwardly inclined guide bar 12 is disposed above the draft bar 10 and is formed at its forward lower end with a vertical extension 13 secured to the forward end of the draft bar 10. The upper rear end of the guide bar or rail 12 is secured to an inverted V-shaped support 14 which is secured to the rear portions of the draft bar 10.

A drawbar generally designated as 15 is movably disposed above the draft bar 10 and comprises a pair of elongated parallel bars 16 which have secured to the forward ends thereof a clevis 17 adapted to be connected by means of a coupling pin 18 to a tractor vehicle. The two bars 16 are disposed on opposite sides of the guide bar or rail 12 and a roller 19 is rotatably disposed between the drawbars 16 and is engageable with the lower edge of the guide or rail 12, and with the rear edge of extension 13 when drawbar 15 is in horizontal operative position.

A swinging or rockable link 20 is pivotally secured between the rear end portions of the drawbars 16 on a pivot member 21, and the link 20 at its upper end is rockably mounted on a pivot 22 engaging through an upstanding ear 23 carried by the rear portion of the guide member 12. An elongated spring 24 is connected between a hook 25 which is fixed to the support 14 and to a second hook 26 which is fixed to one of the drawbar members 16. The spring 24 is adapted to constantly urge the drawbar 15 upwardly and rearwardly to the dotted line position shown in Figure 2.

The drawbar 15 is adapted to be latched in a forward position parallel with the draft bar 10 by means of a latching block 27 pivotally mounted on a pivot 28 and disposed between the bars 16. A handle 29 is fixed to the latching block 27 and extends laterally of the guide rail 12 and is formed with an ear 30 with which a spring 31 is connected. The lower end of the spring 31 is connected to a hook or eye 32 which is carried by the adjacent bar 16 so that the latching member 27 will be constantly urged downwardly to a latching position between the two spaced drawbars 16. When the latching member 27 is in the latched position, the rear end thereof will abut against the forward end of the guide member 12, as shown in Figure 2.

In the use and operation of this hitch, the drawbar 15 when in inoperative position is disposed in the dotted line position shown in Figure 2, wherein the drawbar will be disposed on an upward and forwardly inclined angle with respect to the draft bar 10. At this time the draft bar 10 may be in contacting relation at its forward end with the ground so that the drawbar 15 may be positioned substantially parallel with the ground. The clevis 17 is coupled by the coupling pin 18 to the tractor, and when the tractor is moved forwardly the drawbar 15 will move therewith and the latch member 27 will slide along the upper edge of the guide 12. When the drawbar 15 is substantially at the forward end of the guide 12 with the roller 19 engaging the lower edge of the guide 12 and pulling or raising the draft bar 10, the drawbar 15 will be positioned substantially parallel with the draft bar 10. At this time the latch member 27 will drop down between the bars 16 and will bear against the forward end of the guide 12.

I do not mean to confine myself to the exact details of construction herein disclosed but claim all variations falling within the purview of the appended claims.

What I claim is:

1. A hitch for a tractor drawn vehicle having a draft bar, said hitch comprising an upwardly and rearwardly inclined guide fixed to said draft bar, said guide terminated at its lower forward end in a vertical extension, a drawbar formed of a pair of parallel bars straddling said guide, a link pivotally connected between the rear end of said guide and the rear end of said drawbar for swingably supporting said drawbar, and latch means carried by said drawbar engageable with said extension for releasably latching said drawbar in a forward operative position.

2. A hitch for a tractor drawn vehicle having a draft bar, said hitch comprising an upwardly and rearwardly inclined guide fixed to said draft bar, said guide terminated at its lower forward end in a vertical extension, a drawbar formed of a pair of parallel bars straddling said guide, a link pivotally connected between the rear end of said guide and the rear end of said drawbar for swingably supporting said drawbar, a spring connected between the forward end of said drawbar and the rear of said guide to constantly urge said drawbar upwardly and rearwardly to inoperative position, and latch means carried by said drawbar engageable with said extension for releasably latching said drawbar in a forward operative position.

3. A hitch for a tractor drawn vehicle having a draft bar, said hitch comprising an upwardly and rearwardly inclined guide fixed to said draft bar, said guide terminated at its lower forward end in a vertical extension, a drawbar formed of a pair of parallel bars straddling said guide, said drawbar comprising a pair of elonagted parallel bars, means connecting said bars together in spaced relation, a link pivotally connected between the rear end of said guide and the rear end of said drawbar for swingably supporting said drawbar, and latch means carried by said drawbar engageable with said extension for releasably latching said drawbar in a forward operative position.

4. A hitch for a tractor drawn vehicle having a draft bar, said hitch having an upwardly and rearwardly inclined guide formed with a depending vertical forward end, means securing the rear end of said guide to said draft bar in upwardly offset relation with respect to the latter, a drawbar formed of a pair of parallel bars loosely engaging on opposite sides of said guide, a roller rotatably disposed between said pair of bars and engaging the rear edge of said extension when said pair of bars are in a horizontal operative position, a link pivotally secured at one end to said guide adjacent the rear of the latter, means pivotally securing the other end of said link to the rear ends of said pair of bars to thereby swingably support said drawbar, and a latch member pivotally engaging between said pair of bars forwardly of said roller and engageable when in latching position with the forward edge of said extension.

DANIEL W. GEHRON.

REFERENCES CITED

The following references are of record in the file of this patent:

UNITED STATES PATENTS

| Number | Name | Date |
|---|---|---|
| 2,194,087 | Jager | Mar. 19, 1940 |
| 2,269,023 | Hendricks | Jan. 6 1942 |